UNITED STATES PATENT OFFICE

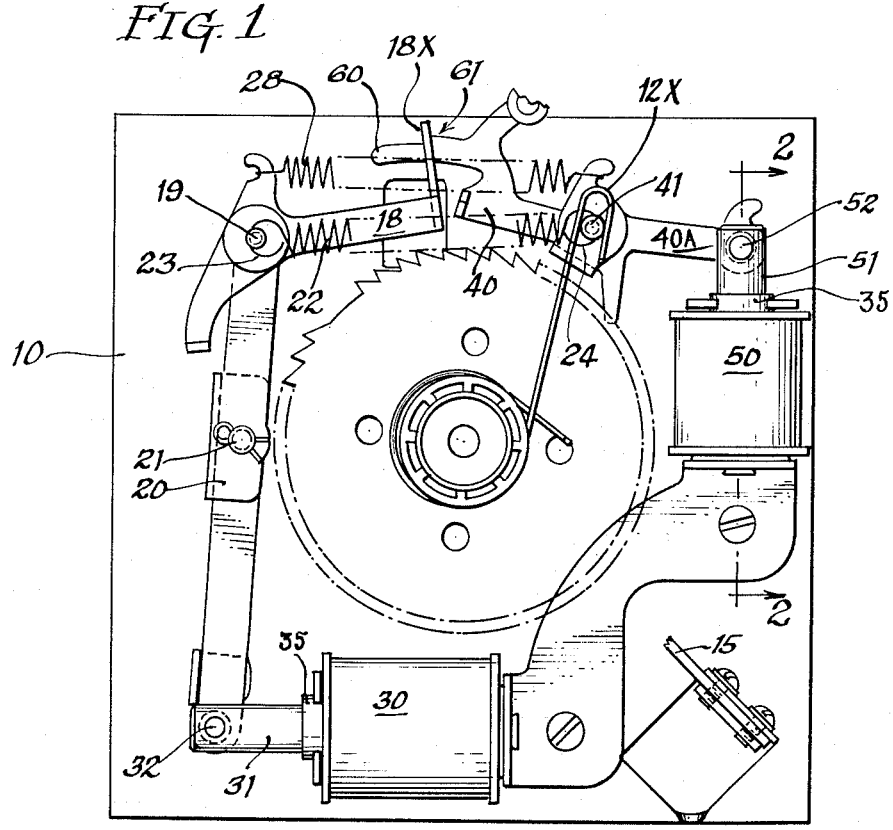

3,010,055
SOLENOID PLUNGER WITH LOCALIZED BEARING
Frank G. Nicolaus, Chicago, Ill., assignor to Raymond T. Moloney, Chicago, Ill.; American National Bank and Trust Company of Chicago, executor of Raymond T. Moloney, deceased
Filed July 30, 1956, Ser. No. 601,079
2 Claims. (Cl. 317—191)

The present disclosures relate to improvements in electromagnetic solenoids, and more particularly to the plungers employed therein, it being the principal object to provide a bearing means for the reciprocably-moving type of solenoid plunger of such character as to provide a minimum interference with optimum magnetic performance and which shall eliminate failures arising from seizure and sticking of such plungers in the plunger guide tubes usually provided in a common type of solenoid.

A more particular object is the provision of a solenoid plunger having a driving connection near one end and a localized narrow bearing means near the opposite end thereof with a surface bearing lying beyond the diametric surface margins of the remainder of the plunger, together with a guide and bearing tube for the plunger having a suitable diameter for optimum bearing fit with said bearing means and sufficient clearance for the remaining plunger surface to permit the plunger to wobble or gyrate within the tube.

Additional objects and aspects of novelty and utility will appear as the following description proceeds in view of the annexed drawing, in which:

FIG. 1 is a front elevation of an electromagnetic step-up mechanism utilizing the new solenoid structure;

FIG. 2 is a fragmentary cross sectional view of one of the new solenoids and its plunger as viewed in the direction of lines 2—2 of FIG. 1;

FIG. 3 is an enlarged cross sectional operating detail similar to FIG. 2 illustrative of the plunger gyration;

FIG. 4 is a magnified cross-section taken along lines 4—4 of FIG. 3.

While the improved solenoid means is of general application, it has proved especially advantageous in connection with certain ratchet mechanisms such as that depicted in FIG. 1, showing a type of step-up mechanism described in greater detail in my copending application, Serial No. 581,522, filed April 30, 1956, now Patent No. 2,895,340, issued July 21, 1959, and which includes a metal mounting plate 10 upon which is journalled a large ratchet wheel 11 normally urged by a large torsion spring 12, carried upon the hub portion 13 of the wheel, into a starting position determined by the engagement of a stop formation 14 on said wheel with a spring stop arm 15.

Means for stepping or advancing the ratchet includes a stepping pawl 18 pivoted on pin means 19 on the upper end of a drive lever 20, which in turn is pivoted on the base plate on another pin 21.

One end 23 of a long coil spring 22 is anchored to pin 19 to urge the drive lever in a clockwise sense so that the stepping pawl 18 (when free to be urged downwardly into the ratchet teeth by its coil spring 28) will advance the ratchet wheel one tooth at a time responsive to each retractive or counterclockwise movement of the drive lever 20 under urgence of a stepping solenoid 30, the plunger 31 of which is pivotally connected as at pin 32 to the lower end of said drive lever, so that upon deenergization of said solenoid, the driving spring 22 pulls said lever, and hence the stepping pawl, toward the righ to step the wheel as aforesaid.

The ratchet mechanism includes a holding pawl 40 pivoted upon the base plate on a pin means 41 upon which the opposite end 24 of the drive spring is anchored and which also serves as an anchoring post for one extended end 12X of the ratchet-wheel torsion spring 12.

The holding pawl 40 is shown in raised or released condition as a result of the downward attraction of the plunger 51 of a second or releasing solenoid 50 and the pivotal connection as at 52 of an extension 40A from the holding pawl, by reason of which plunger action the pawl has been pivoted clockwise to lift the pawl portion from the ratchet teeth, in which condition the return spring 12 can act to turn the ratchet wheel counterclockwise to the limit permitted by the stop arm 15.

It may be observed in FIG. 1 that the holding pawl includes a lock-and-release pawl extension 60 which engages in an upwardly extended portion 18X of the stepping pawl, such that when the holding pawl is elevated by action of solenoid 50, as aforesaid, the lock and release pawl portion 60 also elevates the stepping pawl and raises it clear of the ratchet teeth so that the ratchet wheel is freed of all pawls for unimpeded return motion.

As set forth more fully in said copending application, the lock and release pawl means further includes a notched lock formation 61 shaped and situated angularly relative to the extended portion 18X of the stepping pawl so as to interlock with the latter in the fully raised and released condition of both the stepping and holding pawls, as aforesaid, with the result that the condition shown in FIG. 1 is therefore a fully released condition, and the two pawls are releasably maintained in such condition by the interlock of parts 61 and 18X, and will remain so indefinitely until the next advancing step is taken, that is, until the stepping solenoid is pulsed again with a consequent stepping movement of the drive lever 20 and the stepping pawl 18.

In devices of this class, the solenoids 30 and 50 are subjected to considerable abuse and wear, and many expediencies have been resorted to, with the object of eliminating or minimizing such wear and the resultant failure and servicing of the parts involved.

Heretofore, it has been the common practice in manufacturing such solenoids, and many analogous forms thereof, to employ a brass plunger tube in the bore of the coil and to have the plunger, which is made of iron or some ferromagnetic material of suitable magnetic properties, fit with some minimum degree of looseness in said tube for driving reciprocation thereon.

In such practice the plunger soon becomes plated with a coating of brass which builds up to a troublesome thickness sufficient after a time to cause the plunger to stick or become seized in the tube, and thus to bring about a complete failure of the mechanism.

Trouble also arises from the fact that solenoid plungers are acted upon with an attractive pull which is greatly increased near the end of their working stroke, so that the heel of such a plunger tends to hammer home against any stop or heel plug 75 (FIG. 2) provided at the bottom of the bore, and uneven wear is experienced on the connecting pins 32 or 52 which tends to aggravate the conditions which hasten breakdown.

The present invention greatly reduces, and in a practical sense may be said to eliminate, solenoid failures arising from freezing or jamming of plungers in metal plunger tubes owing to plating build-up and crank pin wear such as described.

The new construction, as shown in FIG. 2, continues the use of a brass bore tube 35 (FIG. 3 also) and deliberately allows as much clearance 36 between the surface of the plunger and the inside face of the tube as may be consistent with optimum magnetic efficiency in the particular construction involved; and instead of attempting to hold the plunger clearances and wobble or side play to some minimized or optimum value, as was the old practice, the new construction purposely permits a decided and substantial amount of gyration or oscillation of the plunger so that the action at pin 52 is freer and more properly that of a true crank with reduced wear at this point.

The magnified sectional detail of FIG. 3 illustrates the sizable wobble or freedom of lateral motion permitted the new plunger structure by the broken-line change of position there shown, such movement being achieved by providing a narrow bearing means near the lower or heel end of the plunger.

In a preferred construction, the narrow localized bearing means is provided in the form of a split-nylon ring or band 54 seated in a groove 55 turned in the plunger, the split 56 (FIG. 2) in this ring permitting sufficient temporary spread for applying and seating the same.

In such a construction, the diameter of the plunger may be reduced for the necessary free rocking clearance in a standard diameter brass tube 35; and the oscillatory or gyratory freedom of motion of the plunger then takes place about a center locating generally within the region enclosed by the boundaries of the narrow bearing ring.

With the crank pin 52 located close to one end of the elongated plunger, and the relatively narrow bearing ring located remotely therefrom and toward the opposite extremity thereof, said crank pin, as employed for example with the lever 40A, will describe the usual arc in its oscillatory range of travel; but instead of thrusting the solenoid plunger in divers directions against the walls of tube 35, the rocking or wobble clearance 36 (FIG. 3) now allows the upper regions of the plunger a substantial freedom to move laterally without necessity of any portion of the plunger ever touching any portion of the brass bore tube; and the entire bearing area for the plunger is reduced to the very much smaller outside surface of the bearing ring 54.

As a result of this simple improvement, solenoids which were previously capable of performing reliably for little more than one million operations now have been continuing beyond ten million operations with no seizing or sticking or failure due to the brass-on-iron plating phenomenon heretofore encountered, and troubles due to wear on the connecting pins 32 are likewise minimized.

Since the dimensions of solenoids and plungers working therein vary greatly according to the work to be done the dimensions for the narrow bearing bands relative to other solenoid parameters, such as diameter of the plunger, length of its working stroke, are mainly empirical, it being only necessary for successful application of the invention to any solenoid plunger to provide a total localized bearing area (e.g. the total bearing surface of the band 54) and a plunger-surface to inside tube-wall surface clearance, which will permit the plunger to wobble or oscillate or gyrate an amount to afford the full desired range of arcuate travel required for the connecting or crank pin 32 or like means which provides the driving connection between the plunger and whatever is to be driven thereby, e.g. the step-up lever 20, or release lever 40—40A.

It will be understood that if the "narrowness" of the band, that is to say its width measured in the direction of the long axis or axis of motion of the plunger, is progressively increased with the clearance and length of stroke held constant, the degree of wobble or permitted gyration will likewise be progressively reduced until a point will be reached where there is no practical or useful wobble or play remaining, thus establishing an upper limit of "narrowness" for the localized bearing means. In the opposite direction the lower limit of narrowness is governed only by the practical requirement for a surface which shall afford satisfactory bearing action, hold its shape, and remain in position in attachment to the plunger, and afford the desired range of wobble in relation to the working stroke and allowed clearance, and have a suitable wear life.

It follows that for a given inside diameter and length of tube, stroke and length of plunger, the width or "narrowness" of the applied bearing band 54 may be varied to determine or limit the range of wobble at the upper end of the plunger so as to limit the sidewise motion especially in the region 35X at the mouth of the tube. Such a precaution would be necessary only where there might be excessive play in the crank bearing connection at 52 and very loose movements in the lever means 20, or 40A.

Prior attempts to overcome the several objections to the old type of solenoid plunger have included making an enlarged head or bulb at the lower end of the plunger, but this expediency does not overcome (although it does greatly reduce) the plating action, and it requires waste of material and extra cost to machine a plunger to such a special shape, and adds substantial weight at the heel end thereof.

I claim:

1. In an electromagnetic solenoid, the combination, with a solenoid coil having a bore for an armature plunger, a plunger tube in the bore of the coil in which a plunger is to be reciprocated, of improvements comprising, namely: a plunger of lesser diameter than that of the inside of said tube and sufficiently less than a sliding clearance to permit an appreciably free lateral movement of said plunger therein, means providing for driving connection with one end region of said plunger and a narrow, circumambient bearing means in the form of a non-metallic band fitted onto the plunger near the opposite end thereof and slidably fitting in said tube and of a degree of narrowness lengthwise of the plunger to permit the latter to wobble within said tube throughout the length of travel of the plunger therein in its working stroke without having the plunger touch the inside wall of said tube.

2. A combination according to claim 1 in which said band is formed from a moldable synthetic plastic material of the class of nylon and is provided with a complete lengthwise split opening into the axial ends of the band and of a width relative to the diameter of the plunger portions embraced thereby to prevent accidental separation from the plunger and permit temporary spread for removal from, or seating on, the plunger.

References Cited in the file of this patent

UNITED STATES PATENTS

| | | |
|---|---|---|
| 765,550 | Brown | July 19, 1904 |
| 1,158,991 | Dixon et al. | Nov. 2, 1915 |
| 1,389,625 | Churchward | Sept. 6, 1921 |
| 1,934,663 | Goldsborough | Nov. 7, 1933 |
| 2,246,086 | Austin | June 17, 1941 |
| 2,246,092 | Gilman | June 17, 1941 |

FOREIGN PATENTS

| | | |
|---|---|---|
| 665,565 | Germany | Sept. 29, 1938 |